(12) United States Patent
Fox et al.

(10) Patent No.: US 6,896,828 B2
(45) Date of Patent: *May 24, 2005

(54) ELECTRICALLY CONDUCTIVE THERMOPLASTIC POLYMER COMPOSITION

(75) Inventors: Richard T. Fox, Midland, MI (US); Vijay Wani, Midland, MI (US); Michael E. Hus, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/389,479

(22) Filed: Mar. 14, 2003

(65) Prior Publication Data

US 2003/0173550 A1 Sep. 18, 2003

Related U.S. Application Data

(63) Continuation-in-part of application No. 10/247,905, filed on Sep. 20, 2002.
(60) Provisional application No. 60/333,187, filed on Nov. 13, 2001.

(51) Int. Cl.[7] .................................................. H01B 1/22
(52) U.S. Cl. ........................................ 252/512; 264/104
(58) Field of Search ................................. 252/512, 514; 264/104

(56) References Cited

U.S. PATENT DOCUMENTS

| | | | |
|---|---|---|---|
| 4,404,125 A | | 9/1983 | Abolins et al. |
| 4,566,990 A | | 1/1986 | Liu et al. |
| 4,596,670 A | | 6/1986 | Liu |
| 4,610,808 A | * | 9/1986 | Kleiner ........................ 252/512 |
| 4,788,104 A | | 11/1988 | Adriaensen et al. |
| 6,156,427 A | | 12/2000 | Gotoh et al. |
| 6,399,737 B1 | | 6/2002 | Elkovitch |

FOREIGN PATENT DOCUMENTS

| | | |
|---|---|---|
| JP | 60088064 | 5/1985 |
| JP | 61209120 | 9/1986 |
| JP | 63090564 | 4/1988 |
| JP | 63092672 | 4/1988 |
| JP | 63280603 | 11/1988 |
| JP | 63297459 | 12/1988 |
| JP | 62101654 | 8/1992 |

* cited by examiner

Primary Examiner—Mark Kopec

(57) ABSTRACT

Disclosed is an electrically conductive thermoplastic polymer composition comprising a thermoplastic polymer, an impact modifier and a combination of metal fibers and metal-coated fibers, structures made therefrom, and a process to make said compositions and structures.

22 Claims, No Drawings

ELECTRICALLY CONDUCTIVE THERMOPLASTIC POLYMER COMPOSITION

CROSS REFERENCE STATEMENT

This application is a CIP of Ser. No. 10/247,905 (filed Sep. 20, 2002, now ALLOWED), which claims benefit of Ser. No. 60/333,187, filed Nov. 13, 2001.

This invention relates to an electrically conductive thermoplastic polymer composition and a structure prepared therefrom and a process for preparing the same.

BACKGROUND OF THE INVENTION

Electronic equipment, particularly sensitive electronic equipment such as computers and communications equipment are all susceptible to malfunction as a result of electromagnetic wave interference. In addition to being sensitive to foreign electromagnetic wave interference, many of these devices generate electromagnetic wave interference. Various methods have been used to impart electromagnetic wave interference shielding to electronic equipment enclosures. Typically, shielding of electronic equipment enclosures is achieved by one or more of three major techniques, i.e., utilizing metal enclosures which, are inherently conductive; utilizing plastic molded enclosures having an electroconductive surface, for example, provided by a conductive film, plating or conductive paint; and molding a conductive plastic enclosure from a polymer containing electroconductive materials.

Attempts have been made to prepare conductive plastics by incorporating certain conductive fillers into engineering thermoplastics. Specifically, these fillers include conductive powders, flakes and fibers. More recently, attempts have been made to find synergistic combinations of conductive fillers so as to provide extrudeable and/or moldable compounds having consistent shielding at lower loadings which maintain properties in the finished molded article. Such combinations include metal fibers and carbon fibers, metal flake and/or carbon fibers in combination with carbon black powder, metal flake and metal or metal-coated fiber, and metal flake and/or metal and/or metal-coated fiber with conductive carbon powder.

Although these combinations have high overall electromagnetic wave interference shielding effectiveness, they suffer from such problems as deteriorating the physical and aesthetic properties of the polymer. Further, the levels of conductive filler required to meet electromagnetic wave interference shielding effectiveness often result in a polymer with such high viscosity it can not practically be molded into electronic equipment enclosures, especially some of the recent thin wall enclosures, such as those found in hand held phones or computers. Another serious problem is the breakage of electroconductive fibers due to shearing and kneading of a polymer and electroconductive fibers to prepare pellets for molding and resulting in lowering the shielding effectiveness in proportion to the degree of breakage. Thus, it is necessary to increase the amount of the electroconductive fibers in the polymer in anticipation of the breakage of the electroconductive fibers, but this will bring about such secondary problems as lowering of the productivity and an increase on the weight of the molded article.

SUMMARY OF THE INVENTION

Accordingly, an object of the present invention is to provide a conductive thermoplastic polymer composition with a good balance of electroconductivity, processability, mechanical and aesthetic properties, while reducing the total amount of metallic filler needed to achieve the desired shielding effectiveness.

To achieve the above object according to the present invention, a conductive thermoplastic polymer composition is provided, which comprises a thermoplastic polymer, an impact modifier and a combination of a metal fiber and a metal-coated fiber.

Another object of the present invention relates to a process for producing an electrically conductive thermoplastic structure by providing a thermoplastic polymer, an impact modifier and a combination of a metal fiber and a metal-coated fiber to a melt blending apparatus, preferably an injection molding machine or an extruder, then forming an electrically conductive thermoplastic structure, preferably an injection molded article, a blow molded article or an extruded sheet or profile.

In the present invention, molded articles having a distinguished electromagnetic wave interference shield function can be produced by injection molding, blow molding, thermoforming, vacuum-pressure forming, compression molding, etc. Preferably the article is an injection molded article, for example, an electronic equipment housing or an electronic part container for electrostatic charging shield or an article formed from an extruded sheet, for example, a wall for electromagnetic wave interference shield or a protective plate for electronic black boards and display boards.

DETAILED DESCRIPTION OF THE INVENTION

The conductive thermoplastic polymer composition of the present invention is produced from a combination of one or more metal fiber and one or more metal-coated fibers. The metal fibers and metal-coated fibers useful in the present composition are well known and widely available.

Generally, the metal fibers may be made of aluminum, zinc, copper, silver, nickel, iron, gold, titanium, chrome and the like, and alloys thereof such as brass and steel. The preferred metal fiber is stainless steel. Stainless steel fibers include those comprising alloys of iron and chromium, nickel, carbon, manganese, molybdenum, mixtures of the foregoing, and the like. Suitable stainless steel compositions may also be designated according to commonly used grades such as stainless steel 302, 304, 316, 347, and the like. For example stainless steel fibers are commercially available from Bekaert under the tradename BEKI-SHIELD™.

Suitable metal fibers may be essentially any length and diameter which is practical from both a composition and processing standpoint, as known in the art. For example, aluminum fibers measuring 10 millimeters (mm) in length by 90 micrometers diameter are useful and practical whereas stainless steel fibers of similar dimensions may be impractical and cause unnecessary wear on the melt processing equipment: instead stainless steel fiber of 6 mm length by 4 micrometers diameter may be more suitable. Generally, all suitable fibers will have a length, prior to melt mixing, of equal to or less than of 20 mm, preferably equal to or less than 15 mm, more preferably equal to or less than 10 mm and most preferably equal to or less than 7 mm. Generally, all suitable fibers will have a length, prior to melt mixing, of equal to or greater than of 0.5 mm, preferably equal to or greater than 1 mm, more preferably equal to or greater than 2 mm and most preferably equal to or greater than 4 mm.

Preferably, iron-base metal fibers, such as stainless steel fibers, have a diameter of about 2 to about 20 micrometers. Other metal-based fibers, for example those of aluminum, zinc, copper, silver, nickel, gold, chrome and the like, preferably have a diameter of about 15 to about 60 micrometers.

The metal fibers preferably have an aspect ratio (the value obtained by dividing the fiber length by the fiber diameter) is from about 200 to about 1000, preferably from about 200 to about 750.

Preferably, the metal fiber is present in an amount equal to or greater than about 1 weight percent, preferably equal to or greater than about 2 weight percent, and more preferably equal to or greater than about 3 weight percent based on the weight of the conductive thermoplastic polymer composition. Preferably, the metal fiber is present in an amount equal to or less than about 15 weight percent, preferably equal to or less than about 13 weight percent, and more preferably equal to or less than about 12 weight percent based on the weight of the conductive thermoplastic polymer composition.

Similarly, the fibers of the metal-coated fibers are generally non-metal fibers such as carbon such as graphite or carbon fibers, ceramic, mica, glass or a polymer (such as acrylic, poly(p-phenylene terephthalamide), e.g., KEVLAR™, polybenzoxazole and the like) core with a coating of silver, nickel, aluminum, chrome, tin, lead, copper, gold, platinum and the like, and alloys thereof such as brass and solder., The preferred metal-coated fibers are nickel-coated carbon and silver-coated glass.

Suitable metal-coated fibers may be essentially any length and diameter which is practical from both a composition and processing standpoint, as known in the art. Generally, all suitable metal-coated fibers will have a length, prior to melt mixing, of equal to or less than of 20 mm, preferably equal to or less than 15 mm, more preferably equal to or less than 10 mm and most preferably equal to or less than 7 mm. Generally, all suitable metal-coated fibers will have a length, prior to melt mixing, of equal to or greater than of 0.1 mm, preferably equal to or greater than 1 mm, more preferably equal to or greater than 2 mm and most preferably equal to or greater than 4 mm.

The fibers of the metal-coated fibers preferably have a diameter of about 5 to about 100 micrometers.

The thickness of metal coating on the fiber is equal to or less than about 2 micrometers, preferably equal to or less than about 1 micrometer and more preferably equal to or less than about 0.5 micrometer. The thickness of metal coating on the fiber is equal to or greater than about 0.1 micrometers and preferably equal to or greater than about 0.25.

The metal content of the metal-coated fiber may be about 1 to about 50 weight percent, based upon the total weight of the metal-coated fiber. Within this range, it may be preferred to use at least about 10 weight percent of the metal. Also within this range, it may be preferred to use up to about 48 weight percent, more preferably up to about 30 weight percent of the metal, even more preferably up to about 15 weight percent.

The metal-coated fibers preferably have an aspect ratio is from about 200 to about 1000, preferably from about 200 to about 750.

Preferably, the metal-coated fiber is present in an amount equal to or greater than about 1 weight percent, preferably equal to or greater than about 2 weight percent, and more preferably equal to or greater than about 4 weight percent based on the weight of the conductive thermoplastic polymer composition. Preferably, the metal-coated fiber is present in an amount equal to or less than about 25 weight percent, preferably equal to or less than about 20 weight percent, and more preferably equal to or less than about 16 weight percent based on the weight of the conductive thermoplastic polymer composition.

Unless otherwise noted, preferable fiber lengths and aspect ratios hereinabove are for fibers prior to melt blending.

Sources of these fibers include Bekaert Fibre of Marrietta, Ga.; INCO Special Products of Wykoff, N.J.; and Toho Carbon Fibers of Menlo Park, Calif.

The aforementioned combination of metal fiber and metal-coated fiber is useful in most any thermoplastic polymer or polymer blend. Suitable thermoplastic polymers are well known and include polyolefins such as polyethylenes, polypropylenes and cyclic olefins, ethylene and styrene interpolymers, polyvinylchloride, polystyrenes including syndiotactic polystyrene, impact polystyrenes, styrene and acrylonitrile copolymers, acrylonitrile, butadiene and styrene terpolymers, polyesters including polyethylene terephthalate and polybutylene terephthalate, polycarbonates, copolyesterpolycarbonates, polyamides, polyarylamides, thermoplastic polyurethanes, epoxies, polyacrylates, ipolyarylate ether sulfones or ketones, polyphenylene ethers, polyamide-imides, polyether-imides, polyetheresters, liquid crystal polymer or blends thereof.

In general, the thermoplastic polymer is employed in amounts of equal to or greater than about 10 parts by weight, preferably equal to or greater than about 20 parts by weight, more preferably equal to or greater than about 30 parts by weight and most preferably equal to or greater than about 40 parts by weight based on the weight of the total composition. In general, the thermoplastic polymer is used in amounts less than or equal to about 97 parts by weight, preferably less than or equal to about 90 parts by weight, more preferably less than or equal to about 80 parts by weight, even more preferably less than or equal to about 70 parts by weight and most preferably less than or equal to about 65 parts by weight based on the weight of the total composition.

The conductive thermoplastic polymer compositions of the present invention may further comprise an impact modifier. Preferable impact modifiers are elastomeric or rubbery materials having a $T_g$ equal to or less than 0° C., preferably equal to or less than −10° C., more preferably equal to or less than −20° C., and most preferably equal to or less than −30° C. $T_g$ is the temperature or temperature range at which a polymeric material shows an abrupt change in its physical properties, including, for example, mechanical strength. $T_g$ can be determined by differential scanning calorimetry.

Suitable impact modifiers include polymers such as styrene-ethylene-butylene-styrene (SEBS), styrene-butadiene rubber (SBR), polybutadiene (PB), or acrylate rubbers, particularly homopolymers and copolymers of alkyl acrylates having from four to six carbons in the alkyl group. Suitable impact modifiers can also be grafted homopolymers or copolymers of butadiene that are grafted with a polymer of styrene and methyl methacrylate. Some of the preferred rubber-containing materials of this type are the known methyl methacrylate, butadiene, and styrene-type (MBS-type) core/shell grafted copolymers having a $T_g$ equal to or less than 0° C. and a rubber content greater than about 40 percent, typically greater than about 50 percent. They are generally obtained by graft polymerizing styrene and methyl methacrylate and/or equivalent monomers in the presence of a conjugated diene polymer rubber core, preferably a butadiene homo- or co-polymer. The grafting monomers may be added to the reaction mixture simultaneously or in sequence, and, when added in sequence, layers, shells or wart-like appendages can be built up around the substrate latex, or core. The monomers can be added in various ratios to each other.

Other impact modifiers useful in the compositions of this invention are those based generally on a long-chain, hydrocarbon backbone, which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin homopolymer such as polyethylene or polypropylene or copolymer such as ethylene/propylene copolymer, ethylene/styrene copolymer or ethylene/propylene/diene copolymer, which may be grafted with one or more styrenic monomers; neoprene rubber; nitrile rubber; polybutadiene and polyisoprene.

Polyolefin elastomers comprising one or more $C_2$ to $C_{20}$ alpha-olefins in polymerized form are preferred impact modifiers. Examples of the types of polymers from which the present polyolefin elastomers are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

A preferable polyolefin elastomer is a substantially linear ethylene polymer (SLEP) or a linear ethylene polymer (LEP), or a mixture of one or more of each. Both substantially linear ethylene polymers and linear ethylene polymers (S/LEP) are known. Substantially linear ethylene polymers and their method of preparation are fully described in U.S. Pat. No. 5,272,236 and U.S. Pat. No. 5,278,272. Linear ethylene polymers and their method of preparation are fully disclosed in U.S. Pat. No. 3,645,992; U.S. Pat. No. 4,937,299; U.S. Pat. No. 4,701,432; U.S. Pat. No. 4,937,301; U.S. Pat. No. 4,935,397; U.S. Pat. No. 5,055,438; EP 129,368; EP 260,999; and WO 90/07526.

Part or all of the impact modifier, in particularly a polyolefin elastomer, a random copolymer or a block copolymer, may be graft modified. A preferred graft modification is achieved with any unsaturated organic compound containing, in addition to at least one ethylenic unsaturation (for example, at least one double bond), at least one carbonyl group (—C=O) and that will graft to an impact modifier as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the impact modifier by any known technique.

The unsaturated organic compound content of the grafted impact modifier is at least 0.01 weight percent, preferably at least 0.1 weight percent and most preferably at least 0.5 weight percent based on the combined weight of the impact modifier and organic compound. The maximum amount of unsaturated organic compound content can vary to convenience, but typically it does not exceed 10 weight percent, preferably it does not exceed 5 weight percent and most preferably it does not exceed 2 weight percent based on the combined weight of the polypropylene and the organic compound.

The impact modifier is employed in the conductive thermoplastic polymer composition of the present invention in amounts sufficient to provide the desired balance of processability and impact resistance. In general, the impact modifier is employed in amounts of equal to or greater than about 1 part by weight, preferably equal to or greater than about 5 parts by weight, more preferably equal to or greater than about 10 parts by weight and most preferably equal to or greater than about 12 parts by weight based on the weight of the total composition. In general, the impact modifier is used in amounts less than or equal to about 50 parts by weight, preferably less than or equal to about 45 parts by weight, more preferably less than or equal to about 40 parts by weight, even more preferably less than or equal to about 35 parts by weight and most preferably less than or equal to about 30 parts by weight based on the weight of the total composition.

Additionally, ignition resistance additives, such as, but not limited to halogenated hydrocarbons, halogenated carbonate oligomers such as phenoxy terminated tetrabromobisphenol A-carbonate oligomer available as BC-52 from Great Lakes Chemical, halogenated diglycidyl ethers such as tetrabromobisphenol A-tetrabromobisphenol A diglycidyl ether available as F2400 from Ameribrom, Inc., phosphorous compounds, fluorinated olefins such as tetrafluoroethylene polymers, siloxanes including organopolysiloxanes, antimony oxide and metal salts of aromatic sulfur compound, or a mixture thereof may be used.

Suitable phosphorous compounds employed in the present invention are one or more phosphorous compounds which include organophosphates, organophosphonites, organophosphonates, organophosphites, organophosphinites, organophosphinates, or mixtures thereof. Suitable organophosphorous compounds are disclosed, for example, in U.S. Pat. No. Re. 36,188; U.S. Pat. Nos. 5,672,645; and 5,276,077. A preferred organophosphorous compound is a monophosphorous compound represented by Formula I:

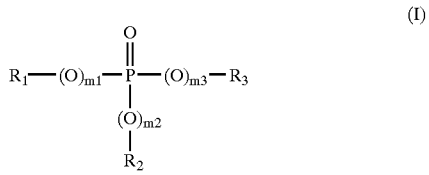

wherein $R_1$, $R_2$, and $R_3$, each represent an aryl or an alkaryl group chosen independently of each other and m1, m2, and m3 each independently of each other are 0 or 1.

Most preferred monophosphorus compounds are monophosphates where m1, m2, and m3 are all 1 and $R_1$, $R_2$, and $R_3$ are independently methyl, phenyl, cresyl, xylyl, cumyl, naphthyl, clorophenyl, bromophenyl, pentachlorophenyl, or pentabromophenyl, for example, trimethyl phosphate, triphenyl phosphate, all isomers of tricresyl phosphate and mixtures thereof, especially tri(4-methylphenyl) phosphate, all isomers of trixylyl phosphate and mixtures thereof, especially tri(2,6-dimethylphenyl) phosphate, tricresyl phosphate, all isomers of tricumyl phosphate and mixtures thereof, trinaphthyl phosphate, all isomers of tri (chlorophenyl) phosphate and mixtures thereof, all isomers of tri(bromophenyl) phosphate and mixtures thereof, tri (pentachlorophenyl) phosphate, tri(pentabromophenyl) phosphate, or mixtures thereof.

Another preferred organophosphorous compound is a multiphosphorous compound represented by Formula II:

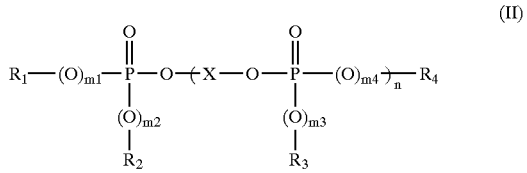

wherein $R_1$, $R_2$, $R_3$, and $R_4$ each represent an aryl or an alkaryl group chosen independently of each other, X is an arylene group derived from a dihydric compound, m1, m2, m3, and m4 each independently of each other are 0 or 1 and n has an average value greater than 0 and r less than 0, when n is equal to or greater than 1 these multiphosphorous compounds are sometimes referred to as oligomeric phosphorous compounds.

Preferred multiphosphorous compounds are multiphosphates where m1, m2, m3, and m4 are 1, $R_1$, $R_1$, $R_2$, $R_3$, and $R_4$ are independently methyl, phenyl, cresyl, xylyl, cumyl, naphthyl, clorophenyl, bromophenyl, pentachlorophenyl, or pentabromophenyl, X is an arylene group derived from a dihydric compound, for example, resorcinol, hydroquinone, bisphenol A and chlorides and bromides thereof, and n has an average value greater than 0 and equal to or less than about 5, preferably n has an average value equal to or greater than about 1 and equal to or less than about 5, more preferably n is equal to or greater than about 1 and equal to or less then about 2.5, more preferably n is equal to or greater than about 1 and equal to or less then about 1.8 and most preferably n is equal to or greater than about 1 and equal 0 or less than about 1.2. For example, preferred oligomeric phosphates having an n value between 1 and 2 are m-phenylene-bis(diphenylphosphate), p-phenylene-bis(diphenylphosphate), m-phenylene-bis(dicresylphosphate), p-phenylene-bis(dicresylphosphate), m-phenylene-bis(dixylylphosphate), p-phenylene-bis(dixylylphosphate), Bis phenol-A-bis(diphenylphosphate), Bis phenol A-bis(dicresylphosphate), Bis phenol A-bis(dixylylphosphate), or mixtures thereof.

A most preferred phosphorous compound is a mixture of one or more monophosphorous compounds of Formula I and one and/or more multiphosphorous compounds of Formula II.

The ignition resistant additive component is employed in an amount sufficient for the ignition resistant compositions of the present invention to meet UL 94 HB, V-2, V-1, V-0 and/or 5V requirements, in an amount equal to or greater than about 0.1 part, preferably equal to or greater than about 1 part, more preferably equal to or greater than about 2.5 parts, even more preferably equal to or greater than about 5 parts, and most preferably equal to or greater than about 7.5 parts by weight based on the weight of the ignition resistant polymer composition. In general the ignition resistant additive component is used in amounts less than or equal to about 35 parts, preferably less than or equal to about 30 parts, more preferably less than or equal to about 25 parts, even more preferably less than or equal to about 20 parts, and most preferably less than or equal to about 15 parts by weight based on the weight of the ignition resistant polymer composition.

In addition, the claimed polymer blend compositions may also optionally contain one or more additives that are commonly used in polymer blend compositions of this type. Preferred additives of this type include, but are not limited to: fillers, reinforcements, stabilizers, colorants, antioxidants, antistats, flow enhancers, mold releases, nucleating agents, etc. Preferred examples of additives are fillers, such as, but not limited to talc, clay, wollastonite, mica, glass or a mixture thereof. Further, compounds which stabilize polymer blend compositions against degradation caused by, but not limited to heat, light, and oxygen, or a mixture thereof may be used.

If used, such additives may be present in an amount equal to or greater than about 0.01 percent by weight, preferably equal to or greater than about 0.1 percent by weight, more preferably equal to or greater than about 1 percent by weight, even more preferably equal to or greater than about 2 percent by weight, and most preferably equal to or greater than about 5 percent by weight based on the weight of the polymer blend composition. Generally, the additive is present in an amount less than or equal to about 25 percent by weight, preferably less than or equal to about 20 percent by weight, more preferably less than or equal to about 15 percent by weight, even more preferably less than or equal to about 12 percent by weight, and most preferably less than or equal to about 10 percent by weight based on the weight of the polymer blend composition.

Preparation of the electrically conductive polymer composition of the present invention can be accomplished by any suitable mixing means known in the art, for example dry blending the thermoplastic polymer, impact modifier, metal fiber and metal-coated fiber and subsequently melt mixing, either directly in the melt blending apparatus, e.g., an injection molding machine or an extruder, to make the electrically conductive thermoplastic structure of the present invention (e.g., an injection molded article or an extruded sheet or profile), or pre-mixing in a separate extruder (e.g., a Banbury mixer) to produce pellets. Said pellets can then be injection molded or extruded into sheet or profile to produce the electrically conductive thermoplastic structure of the present invention. Alternatively, the thermoplastic polymer and the impact modifier maybe pre-compounded then dry blended with the metal fiber and metal-coated fiber and subsequently melt mixed, either directly in the melt blending apparatus, e.g., an injection molding machine or an extruder, to make the electrically conductive thermoplastic structure of the present invention (e.g., an injection molded article, blow molded article, or an extruded sheet or profile), or pre-mixing in a separate extruder (e.g., a Banbury mixer) to produce pellets. Said pellets can then be injection molded or extruded into sheet or profile to produce the electrically conductive thermoplastic structure of the present invention.

Preferably, dry blends of the compositions are directly injection molded, directly blow molded, or directly extruded into sheet or profile without pre-melt mixing and melt blending to form pellets. The thermoplastic polymer, impact modifier, metal fiber and metal-coated fiber may be introduced into the melt blending apparatus simultaneously in the same location (e.g., feed hopper), individually in different locations (e.g., feed hopper and one or more side feed locations), or in any combination. This process allows for the flexibility of increasing or decreasing the amount of impact modifier and/or increasing or decreasing the amount of metal fiber and/or increasing or decreasing the amount of metal-coated fiber and/or changing the thermoplastic polymer of the conductive thermoplastic polymer composition online. That is, different balance of electromagnetic wave shielding effectiveness and other properties, specifically impact resistance, can be tailored and produced for a specific electrically conductive thermoplastic structure with little effort and minimal inventory of polymers and fibers versus using pre-mixed electrically conductive thermoplastic polymer compositions in the form of pellets.

Preferably, metal and metal-coated fibers tows, sometimes referred to as fiber bundles, are used. Fiber tows are multiple fiber strands bundled together and coated, or impregnated, with a thin polymer layer. The polymer used for coating the bundle may be the same or different from the thermoplastic polymer of the electrically conductive thermoplastic composition. When using fiber tows, it is necessary to decide the mixing amount of the fiber tows in such a manner that the pure metal fiber and/or metal-coated fiber after accounting for the polymer impregnated and adhered in the bundled fibers should be within the aforementioned ranges.

When the electrically conductive thermoplastic structure of the present invention is a sheet, the sheet can be softened or melted by the application of heat, and formed or molded using conventional techniques such as compression molding, vacuum-pressure forming and thermoforming.

EXAMPLES

To illustrate the practice of this invention, examples of preferred embodiments are set forth below. However, these examples do not in any manner restrict the scope of this invention.

The formulation content of Examples 1 to 10 is given in Table 1 below in parts by weight of the total composition. In Table 1:

"PC" is a linear polycarbonate available as CALIBRE™ 401-18 IM polycarbonate resin from the Dow Chemical Company comprising about 5 weight percent MBS having a melt flow rate (MFR) of 18 grams per 10 minutes (g/10 min.) as measured according to ASTM D-1238 under conditions of 300° C./1.2 kg, "Nylon" is a polyamide 6 available as HYLON™ N2000L from Entec Polymers, "EO-g-MAH" is an ethylene and octene polyolefin elastomer copolymer grafted with maleic anhydride available as FUSABOND™ N MN493D from the DuPont Chemical Company, "SS-1" is stainless steel fibers available as tows from BEKI-SHIELD™ GR75/C20 PC stainless steel fibers from Bekaert Fibre Technologies having average lengths of about 6 mm and average diameters of about 8 micrometers. The bundle is about 75 weight percent stainless steel and 25 weight percent polycarbonate, "SS-2" is stainless steel fibers available as tows from BEKI-SHIELD GR75/C16 EAA stainless steel fibers from Bekaert Fibre Technologies having average lengths of about 4 to 5 mm and average diameters of about 8 micrometers. The bundle is about 75 weight percent stainless steel and 25 weight percent ethylene acrylic acid (EAA) zinc ionomer, "SS-3" is stainless steel fibers available as tows from BEKI-SHIELD GR75/C12 Nylon stainless steel fibers from Bekaert Fibre Technologies having average lengths of about 4 to 5 mm and average diameters of about 8 micrometers. The bundle is about 75 weight percent stainless steel and 25 weight percent polyamide 12, "NiC-1" is bundled nickel-coated carbon fibers available as INCOSHIELD™ PC+Nickel nickel-coated carbon fibers from INCO Special Products having an average nickel coating thickness of about 0.25 micrometers on carbon fibers having an average length of about 6.4 mm and the nickel-coated carbon fibers have an average diameter of about 8 micrometers. The bundle is about 60 weight percent nickel coated carbon fibers and 40 weight percent polycarbonate and "NiC-2" is bundled nickel-coated carbon fibers available as INCOSHIELD™ PA6+Nickel nickel-coated carbon fibers from INCO Special Products having an average nickel coating thickness of about 0.25 micrometers on carbon fibers having an average length of about 6.4 mm and the nickel-coated carbon fibers have an average diameter of about 8 micrometers. The bundle is about 60 weight percent nickel coated carbon fibers and 40 weight percent Nylon 6.

The following tests are run on Examples 1 to 10 and the results of these tests are shown in Table 1:

"SE" is shielding effectiveness measured according to ASTM D 4935-99, pp 1–10, 1999 and "Izod" impact resistance as measured by the Notched Izod test (Izod) is determined according to ASTM D 256-90-B at 23° C. The specimens are notched with a TMI 22-05 notcher to give a 0.254 mm radius notch. A 0.91 kilogram pendulum is used. The values are reported in foot pounds per inch (ft-lb/in).

Notched Izod test specimen preparation: The compositions of Examples 1, 2 and 4 are prepared by dry blending polycarbonate resin pellets, a metal fiber tow and/or a metal-coated fiber tow. The mixtures are dried at 100° C. for at least 12 hours. The FUSABOND N MN493D, if present, is added to the dried, dry blended polycarbonate and metal fiber blend prior to injection molding. 3.2 mm thick iso-tensile test specimens are prepared by feeding the dry blended mixtures into a 22 ton Battenfeld reciprocating screw injection molding machine, having a 14:1 length:diameter screw with the following molding conditions: barrel temperature settings of 282/293/299/304/307° C. (feed section to nozzle); a mold temperature of 40 to 50° C.; and the holding pressure immediately after the cavity is filled is held at 73.8 MPa.

The composition of Example 3 is prepared by dry blending polycarbonate resin pellets a metal fiber tow and/or a metal-coated fiber tow. The mixture is dried at 100° C. for at least 12 hours. 3.2 mm thick iso-tensile test specimens are prepared by feeding the dry blended mixtures into a 110 ton Krauss Maffei reciprocating screw injection molding machine, having a 23:1 length:diameter screw with the following molding conditions: barrel temperature settings of 282/293/299/304/307° C. (feed section to nozzle); a mold temperature of 71° C.; and the holding pressure immediately after the cavity is filled is held at 34.5 MPa.

The compositions of Examples 5 to 10 are prepared by dry blending polyamide resin pellets, a metal fiber tow and/or a metal-coated fiber tow. The mixtures are dried at 100° C. for at least 12 hours. The FUSABOND N MN493D and/or SS-2, if present, are added to the dried, dry blend polyamide metal fiber blends prior to injection molding. 3.2 mm thick iso-tensile test specimens are prepared by feeding the dry blended mixtures into a 22 ton Battenfeld reciprocating screw injection molding machine, having a 14:1 length:diameter screw with the following molding conditions: barrel temperature settings of 268/279/279/285/288° C. (feed section to nozzle); a mold temperature of 40 to 50° C.; and the holding pressure immediately after the cavity is filled is held at 73.8 MPa.

Shielding effectiveness test specimen preparation: The compositions of Examples 1 to 4 are prepared by dry blending polycarbonate resin pellets, a metal fiber tow and/or a metal-coated fiber tow. The mixture is dried at 100° C. for at least 12 hours. The FUSABOND N MN493D, it present, is added to the dried, dry blended polycarbonate and metal fiber blend prior to injection molding. 2 mm thick by 133 mm disks are prepared by feeding the dry blended mixtures into a 110 ton Krauss Maffei reciprocating screw injection molding machine, having a 23:1 length:diameter screw with the following molding conditions: barrel temperature settings of 282/293/299/304/307° C. (feed section to nozzle); a mold temperature of 71° C.; and the holding pressure immediately after the cavity is filled is held at 34.5 MPa.

The compositions of Examples 5 to 10 are prepared by dry blending Nylon resin pellets, a metal fiber tow and/or a metal-coated fiber tow. The mixture is dried at 100° C. for at least 12 hours. The FUSABOND N MN493D and/or SS-2, if present, are added to the dried, dry blend polyamide metal fiber blends prior to injection molding. 2 mm thick by 133 mm disks are prepared by feeding the dry blended mixtures into a 110 ton Krauss Maffei reciprocating screw injection molding machine, having a 23:1 length:diameter screw with the following molding conditions: barrel temperature settings for the Nylon blends of 268/27912791285/288° C. (feed section to nozzle); a mold temperature of 65.5° C.; and the holding pressure immediately after the cavity is filled is held at 34.5 MPa.

TABLE 1

| Ex | PC | Nylon | EO-g-MAH | SS-1 | SS-2 | SS-3 | NiC-1 | NiC-2 | SE, dB | Izod, ft-lb/in |
|---|---|---|---|---|---|---|---|---|---|---|
| 1 | balance | | | 3.2 | | | 6.4 | | 49 | 2.2 |
| 2 | balance | | 25 | 3.5 | | | 7 | | 57 | 4.2 |
| 3 | balance | | | 3.1 | | | 12.4 | | 62 | 1.4 |
| 4 | balance | | 25 | 3.3 | | | 13.5 | | 68 | 3.4 |
| 5* | | balance | | | 6.3 | | | 8.5 | 53 | 1.1 |
| 6 | | balance | 25 | | 6.8 | | | 9.2 | 57 | 4.0 |
| 7* | | balance | | | 6.2 | | | 12.5 | 63 | 1.2 |
| 8 | | balance | 25 | | 6.6 | | | 13.4 | 55 | 3.8 |
| 9 | | balance | 25 | | | 6.8 | | 9.2 | 38 | 3.7 |
| 10 | | balance | 25 | | | 6.6 | | 13.4 | 34 | 3.7 |

*not an example of the present invention

What is claimed is:

1. A process to produce an electrically conductive thermoplastic structure comprising the steps of:

(i) providing a thermoplastic polymer, an impact modifier and a combination of a metal fiber and a metal-coated fiber to a melt blending apparatus and (ii) forming an electrically conductive thermoplastic structure.

2. The process of claim 1 wherein the thermoplastic polymer is a polyolefin, polyethylene, polypropylene, cyclic polyolefin, ethylene and styrene interpolymers, polyvinylchloride, polystyrene, impact polystyrene, syndiotactic polystyrene, styrene and acrylonitrile copolymers, acrylonitrile, butadiene and styrene terpolymer, polyester, polyethylene terephthalate, polybutylene terephthalate, polycarbonate, copolyesterpolycarbonate, polyamide, thermoplastic polyurethane, epoxy, polyacrylate, polyarylate ether sulfone, polyarylate ether ketone, polyphenylene ether, polyamide-imide, polyether-imide, polyetheresters, liquid crystal polymer or blends thereof.

3. The process of claim 1 wherein the thermoplastic polymer is a polyamide, a polycarbonate, an acrylonitrile, butadiene and styrene terpolymer, or blends thereof.

4. The process of claim 1 wherein the impact modifier is an MBS rubber, an acrylate rubber, a butyl rubber, a chlorinated polyethylene rubber, a chlorosulfonated polyethylene rubber or a polyolefin elastomer.

5. The process of claim 4 wherein the polyolefin elastomer is a polyethylene homopolymer, a polypropylene homopolymer, an ethylene and propylene copolymer, an ethylene and 1-butene copolymer, an ethylene and 1-hexene copolymer, an ethylene and 1-octene copolymer, an ethylene, propylene and hexadiene terpolymer or an ethylene, propylene and ethylidene norbornene terpolymer.

6. The process of claim 5 wherein the polyolefin elastomer is grafted with maleic anhydride.

7. The process of claim 1 metal fiber is aluminum, zinc, copper, silver, nickel, stainless steel, gold, chrome, and alloys thereof.

8. The process of claim 1 wherein the metal fiber is stainless steel.

9. The process of claim 1 wherein the metal-coated fiber comprises a metal coating on a non-metal fiber.

10. The process of claim 9 wherein the thickness of the metal coating is from about 0.1 micrometer to about 2 micrometers.

11. The process of claim 9 wherein the metal coating is silver, nickel, aluminum, chrome, tin, lead, copper, and alloys thereof.

12. The process of claim 9 wherein the non-conductive fiber is carbon, glass or a polymer.

13. The process of claim 1 wherein the metal-coated fiber is nickel-coated carbon.

14. The process of claim 1 wherein in step (i) one or more ignition resistant additive is provided to the melt blending apparatus.

15. The process of claim 14 wherein the ignition resistant additive is a halogenated hydrocarbon, a halogenated carbonate oligomer, a halogenated diglycidyl ether, a phosphorous compound, a fluorinated olefin, an organopolysiloxanes, antimony oxide, a metal salt of an aromatic sulfur compound or a mixture thereof.

16. The process of claim 14 wherein the ignition resistant additive is a phenoxy terminated tetrabromobisphenol A-carbonate oligomer or a tetrabromobisphenol A-tetrabromobisphenol A diglycidyl ether.

17. The process of claim 15 wherein the phosphorous compound is chosen from (i) one or more monophosphorous compounds represented by Formula I:

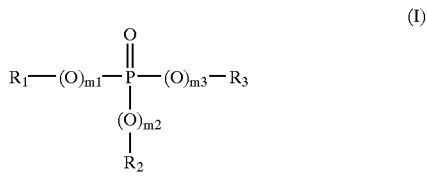

(I)

wherein $R_1$, $R_2$, and $R_3$, each represent an aryl or an alkaryl group chosen independently of each other and m1, m2, and m3 each independently of each other are 0 or 1, (ii) one or more multiphosphorous compounds represented by Formula II:

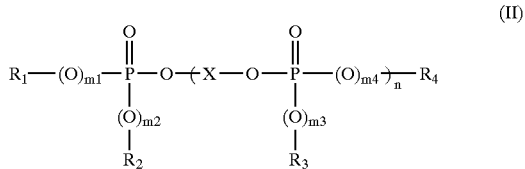

(II)

wherein $R_1$, $R_2$, $R_3$, and $R_4$ each represent an aryl or an alkaryl group chosen independently of each other, X is an arylene group derived from a dihydric compound, m1, m2, m3, and m4 each independently of each other are 0 or 1 and n has an average value greater than 0 and less than 10 or (iii) a mixture of one or more monophosphorous compounds of Formula I and one or more multiphosphorous compounds of Formula II.

18. The process of claim 1 wherein the metal fiber is provided in amount from about 2 weight percent to about 15 weight percent based on the volume of the electrical conductive thermoplastic.

19. The process of claim 1 wherein the metal-coated fiber is provided in amount from about 3 weight percent to about 25 weight percent.

20. The process of claim 1 wherein the melt blending apparatus is an injection molding machine, a blow molding machine or an extruder.

21. The process of claim 1 wherein the electrically conductive thermoplastic structure is an injection molded article, a blow molded article, or an extruded sheet or profile.

22. An electrically conductive thermoplastic structure produced by the process of claim 1.

* * * * *